United States Patent
Koshimizu et al.

(12)

(10) Patent No.: US 6,466,376 B2
(45) Date of Patent: Oct. 15, 2002

(54) PLASTIC LENS AND PRODUCTION METHOD THEREOF

(75) Inventors: Toshiyuki Koshimizu; Kazuo Ishida; Etsuzo Kurihara, all of Hachioji (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 09/740,818

(22) Filed: Dec. 21, 2000

(65) Prior Publication Data

US 2001/0007513 A1 Jul. 12, 2001

(30) Foreign Application Priority Data

Dec. 24, 1999 (JP) .......................... 11-366150

(51) Int. Cl.[7] .............. G02B 3/00; G02B 7/02; B29D 11/00
(52) U.S. Cl. ............ 359/642; 359/819; 359/830; 425/808
(58) Field of Search ............ 359/719, 811, 359/812, 829, 830, 642, 819; 425/808

(56) References Cited

U.S. PATENT DOCUMENTS

| | | | | |
|---|---|---|---|---|
| 5,905,599 A | * | 5/1999 | Nomura et al. | 359/819 |
| 5,975,882 A | * | 11/1999 | Nomura et al. | 425/808 |
| 6,008,955 A | * | 12/1999 | Nomura et al. | 359/719 |
| 6,055,111 A | * | 4/2000 | Nomura et al. | 359/642 |
| 6,078,430 A | * | 6/2000 | Fukuda et al. | 359/642 |
| 6,144,500 A | * | 11/2000 | Iwaki et al. | 359/719 |
| 6,219,191 B1 | * | 4/2001 | Iwaki et al. | 359/811 |

* cited by examiner

Primary Examiner—Georgia Epps
Assistant Examiner—Gary O'Neill
(74) Attorney, Agent, or Firm—Finnegan, Henderson, Farabow, Garrett & Dunner, L.L.P.

(57) ABSTRACT

A plastic lens molded through a gate in a molding process has a gate-located portion on an outer peripheral surface of the plastic lens, and a concave surface provided on at least a part of the gate-located portion.

13 Claims, 15 Drawing Sheets

PLASTIC LENS AND PRODUCTION METHOD THEREOF

BACKGROUND OF THE INVENTION

The present invention relates to a plastic lens formed by the injection molding and to a production method thereof.

The plastic lens is used for, for example, an optical system for optical pick-up apparatus and cameras. When such the plastic lens is molded by the injection molding, at least a gate portion which is a resin injection path, is integrally formed with the plastic lens at the time of molding.

The integrally formed gate portion at the molding, is cut from the plastic lens and removed after that. Conventionally, as shown in FIG. 12, the plastic lens in which a gate-cut plane 100b formed when the gate portion 100a integrally formed at the time of the molding of the plastic lens 100 is cut, is linear, or as shown in FIG. 13, the gate-cut plane 100b is arc-shaped along the outer periphery of the plastic lens, is well known.

Further, as shown in FIG. 14, a plastic lens 100 in which a gate-cut plane 100b formed by cutting a gate portion 100a is made to be the same arc-shaped as the plastic lens as shown in FIG. 13, and further, at a different position from the gate-cut plane 100b, a gate position indicating section 100c showing the gate-located position is formed, is known.

In this connection, in the plastic lens formed such the injection molding, generally, the un-uniformity of the molecular orientation or inner distortion is generated due to the injection molding, and when the plastic lens is rotated around the optical axis of the plastic lens, the optical performance of the lens is changed. Accordingly, for example, when the mounting position of the plastic lens to each kind of optical system or apparatus is not constant for the plastic lens rotational direction, the performance among products are not stable even in the same optical system or same apparatus, and there is a case where a desired optical characteristic can not be obtained.

Accordingly, the mounting position is made constant, for example, on the basis of a portion corresponding to a position at which the gate portion of the plastic lens existed (hereinafter, called gate-located position), however, in the gate-cut plane 100b which is linear as shown in FIG. 12, or the arc-shaped gate-cut plane 100b along the outer periphery of the plastic lens as shown in FIG. 13, specifically for the down sizing of the plastic lens, the more the width of the flange portion of the plastic lens is reduced, or the more the diameter of the plastic lens is decreased, the more the gate-cut plane of the plastic lens is difficult to be distinguished from the outer periphery of the other plastic lens, and problems in which the gate-located position or the central gate-located position which is the central portion of the gate portion can not be detected, and the detection accuracy is lowered, and the operability of the assembling is lowered, occur.

On the one hand, in the plastic lens shown in FIG. 14, a gate position indicating section 100c showing the gate-located position is formed at a position different from the gate-cut plane 100b, and when the detection of the gate position indicating section 100c is easy, and the positional relationship with the gate-located position of the gate position indicating section 100c is clear, the assembling position can be made constant on the basis of the gate position indicating section 100c, however, when the gate position indicating section is provided on the position as shown in FIG. 14, it is also difficult for the operator who generally looks the plastic lens from the optical axis direction (the direction along the optical axis) to detect the gate position indicating section, and it is also difficult to correspond to it by using the conventional commonly used detector, and there is also a problem that it is yet insufficient to obtain the plastic lens which has the easily assembling operability unless the easiness of detection is increased, further, without decreasing the detection accuracy. Further, there is also a problem that the new detector to detect the gate position indicating section is necessary, and the production cost of the product is increased.

Furthermore, when the gate position indicating section is provided as a recess, because it is difficult to provide a recess by the molding die from the problem of the durability and the accuracy of the molding die of the lens, a process to newly provide the gate position indicating section is necessary. Therefore, the problems that the production cost is increased, and the time necessary for the production becomes long, occur.

Further, when the gate position indicating section is provided as a protrusion, the following problem occurs. When the gate position indicating section of the gate portion of the plastic lens is cut, it is preferable to use the masking so that the chip does not adhere onto the lens surface, however, a problem that, when the protrusion exists, the masking is difficult, and the chip adheres onto the lens surface, occurs.

SUMMARY OF THE INVENTION

The present invention is attained in view of such the problems, and the object of the present invention is to provide a plastic lens by which an object to make the detection of the gate-located position of the plastic lens easy, and to increase the detection accuracy, and an object that the lens can be easily assembled in a desired direction and the optical performance is stabilized, can be stood together, and to provide a production method thereof. Further, the object is to provide the plastic lens and the production method thereof, by which, because the cutting of the gate-located position and the display of the gate-located position can be conducted in the continuous or the same process, the production can be conducted quickly and at low cost. Further, the object is to obtain the plastic lens by which, even when the lens is a small sized one, the gate portion can be easily cut, and there is no flaw in the optical function portion, and the stable optical performance can be obtained. Further object is to obtain the plastic lens which can be stably held.

In order to solve the above problems and attain the objects, the invention is structured as follows.

(1-1) A plastic lens molded through a gate in a molding process, comprises
  a gate-located portion on an outer peripheral surface of the plastic lens, and
  a concave surface provided on at least a part of the gate-located portion.

(1-2) In the plastic lens of (1-1), a form of the concave surface is concave when the form is viewed along an optical axis of the plastic lens.

(1-3) In the plastic lens of (1-1), the concave surface is provided onto an entire surface of the gate-located portion.

(1-4) In the plastic lens of (1-1), the concave surface is provided on at least a part of the gate-cut surface in the gate-located portion.

(1-5) In the plastic lens of (1-4), the gate-cut-out surface other than the concave surface is shaped in a flat surface or an arc-shaped convex surface.

(1-6) In the plastic lens of (1-4), the gate-cut-out surface is the concave surface.

(1-7) In the plastic lens of (1-1), the plastic lens further comprises:
an optical function section to perform an optical function;
wherein the concave portion is provided on an outer peripheral surface of the optical function section.

(1-8) In the plastic lens of (1-1), the plastic lens further comprises:
an optical function section to perform an optical function and
a flange section;
wherein the concave portion is provided on an outer peripheral surface of the flange section.

(1-9) In the plastic lens of (1-1), a distance between an imaginary peripheral surface on the concave portion and a bottom of the concave portion has the shortest distance of 0.15 mm to 0.25 mm.

(1-10) In the plastic lens of (1-1), an angle formed between a line connecting a bottom section of the concave portion to an optical axis of the plastic lens with a shortest distance and a line connecting a center of the gate-located portion to the optical axis with a shortest distance is not larger than 10 degrees.

(1-11) In the plastic lens of (1-1), the concave surface is a curved surface.

(1-12) In the plastic lens of (1-11), a form of the curved surface is shaped an arc when the form is viewed along an optical axis of the plastic lens.

(1-13) In the plastic lens of (1-12), the arc is a part of a circle whose radius is not larger than 1 mm.

(1-14) A method of manufacturing a plastic lens, comprises steps of:
forming the plastic lens through a gate by an injection molding, wherein a gate portion occupied in the gate is formed integrally on an outer periphery of the plastic lens during the step of forming the plastic;
cutting out the gate portion from the outer periphery of the plastic lens; and
providing a concave surface on at least a part of a gate-located portion on the outer periphery of the plastic lens before, during or after the step of cutting the gate portion.

Further, the above object may be attained by the following preferable structures.

(2-1) In a plastic lens having a flange portion on the outer periphery of an optical function portion, the plastic lens in which at least a gate-located portion of the flange portion is the concave surface.

According to the invention described in (2-1), because the gate-located portion including the gate-located position of the flange portion is the concave surface, and the position is definite by the concave surface, when the plastic lens is assembled in the optical apparatus, the detection of the concave surface by eyes or the detector can be easily conducted, thereby, the detection accuracy of the gate-located position is increased. Therefore, the plastic lens can be easily and accurately assembled in the constant direction on the basis of the concave surface, thereby the assembling operability is increased, and the optical performance is stabilized.

(2-2) In a plastic lens having a flange portion on the outer periphery of an optical function portion, the plastic lens in which the flange portion has at least a gate-cut plane, and at least one portion of the gate-located portion of the gate-cut plane is the concave surface.

(2-3) The plastic lens described in (2-2), in which all the gate-located portion is the concave surface.

(2-4) The plastic lens described in (2-2) or (2-3), in which the gate-cut plane other than the concave surface is the plane or arc-shaped convex surface.

(2-5) The plastic lens described in (2-3), in which all the gate-cut plane is the concave surface.

According to the invention described in (2-2) to (2-5), because at least one portion of the gate-located portion of the gate-cut plane of the flange portion is the concave surface, or all of the gate-located portion is the concave surface, the gate-cut plane other than the concave surface is the plane or arc-shaped convex surface, or all of the gate-cut plane is the concave surface, and the gate-located position is definite by the concave surface, when the plastic lens is assembled in the optical apparatus, the detection of the concave surface can be easily conducted by eyes and the detector, thereby, the detection accuracy of the gate-located position is increased. Therefore, the plastic lens can be easily and accurately assembled in the constant direction on the basis of the concave surface, thereby the assembling operability is increased, and the optical performance is stabilized.

Further, according to the invention described in (2-4), because, in the gate-cut plane other than the concave surface, the shape is the plane or the arc-shaped convex surface and different from the other portion, the gate-located position from the optical axis of the plastic lens becomes definite, and the gate-located position becomes definite also from the side surface of the plastic lens, thereby, the detection accuracy of the gate-located position is increased, and the plastic lens can be easily and accurately assembled in the constant direction on the basis of the concave surface, and the lens performance is stabilized and the assembling operability is also increased.

(2-6) The plastic lens described in any one of (2-1) to (2-5), in which the shortest distance between the virtual outer peripheral surface of the flange portion and the bottom portion of the concave surface is 0.15–0.25 mm.

According to the invention described in (6), when the shortest distance between the virtual outer peripheral surface of the flange portion and the bottom portion of the concave surface is 0.15–0.25 mm, in the detection of the gate-located position, specifically detection by eyes can be easily conducted, and the flange portion can not be excessively cut.

(2-7) In the plastic lens, a plastic lens in which the gate-located portion of the optical function portion is the concave surface.

According to the invention described in (2-7), because the gate-located portion of the optical function portion is the concave surface, and the position is definite by the concave surface, when the plastic lens is assembled to the optical apparatus, the detection of the concave surface can be easily conducted by eyes or the detector, thereby the detection accuracy of the gate-located position is increased. Therefore, the plastic lens can be easily and accurately assembled in the constant direction on the basis of the concave surface, and the assembling operability is increased and the optical performance is also stabilized.

(2-8) In the plastic lens, a plastic lens in which the outer peripheral portion of the optical functional portion has the gate-cut plane, and at least one portion of the gate-located portion of the gate-cut plane is the concave surface.

(2-9) In the plastic lens described in (2-8), all of the gate-located portion is the concave surface.

(2-10) In the plastic lens described in (2-8) or (2-9), the gate cutting surface other than the concave surface is the plane or the arc-shaped convex surface.

(2-11) In the plastic lens described in (9), all of the gate-cut plane is the concave surface.

According to the invention described in (2-8) to (2-11), because at least one portion of the gate-located portion of the gate-cut plane of the optical function portion is the concave surface, or all of the gate-located portion is the concave surface, the gate-cut plane other than the concave surface is the plane or arc-shaped convex surface, or all of the gate-cut plane is the concave surface, and the gate-located position is definite by the concave surface, when the plastic lens is assembled in the optical apparatus, the detection of the concave surface can be easily conducted by eyes and the detector, thereby, the detection accuracy of the gate-located position is increased. Therefore, the plastic lens can be easily and accurately assembled in the constant direction on the basis of the concave surface, thereby the assembling operability is increased, and the optical performance is stabilized.

Further, according to the invention described in (2-10), because, in the gate-cut plane other than the concave surface, the shape is the plane or the arc-shaped convex surface and different from the other portion, the gate-located position from the optical axis of the plastic lens becomes definite, and the gate-located position becomes definite also from the side surface of the plastic lens, thereby, the detection accuracy of the gate-located position is increased, and the plastic lens can be easily and accurately assembled in the constant direction on the basis of the concave surface, and the lens performance is stabilized and the assembling operability is also increased.

(2-12) The plastic lens described in any one of (2-7) to (2-11), in which the shortest distance between the virtual outer peripheral surface of the optical functional portion and the bottom portion of the concave surface is 0.15–0.25 mm.

According to the invention described in (2-12), when the shortest distance between the virtual outer peripheral surface of the optical functional portion and the bottom portion of the concave surface is 0.15–0.25 mm, in the detection of the gate-located position, specifically the detection by eyes can be easily conducted, and the optical functional portion can not be excessively cut.

(2-13) The plastic lens described in any one of (2-1) to (2-12), in which an angle formed between the linear line connected between the bottom portion of the concave surface and the optical axis in the shortest distance, and the linear line connected between the center of the gate-located portion and the optical axis in the shortest distance, is within 10°.

According to the invention described in (2-13), when the angle formed between the linear line connected between the bottom portion of the concave surface and the optical axis in the shortest distance, and the linear line connected between the center of the gate-located portion and the optical axis in the shortest distance, is within 10°, the bottom portion of the concave surface shows almost the central gate-located position, thereby, the central gate-located position becomes further definite. Specifically, when the plastic lens is assembled on the basis of the bottom portion of the concave surface, it can be accurately assembled, and the lens performance is further stabilized.

(2-14) The plastic lens described in any one of (2-1) to (2-13), in which the concave surface is the curved surface.

(2-15) The plastic lens described in (2-14), in which, when the concave surface is looked from the optical axis direction, it is arc-shaped.

(2-16) The plastic lens described in (2-15), in which the arc-shape is a portion of the circle whose radius is not larger than 1 mm.

(2-17) The plastic lens described in (2-14), in which, when the curved surface is looked from the optical axis direction, it is U letter-shaped.

According to the invention described in (2-14) to (2-17), when the shape of the concave surface is formed to the curved surface, the formation of the gate-cut plane including the formation of the concave surface becomes easy. Specifically, in the case where the curved surface is formed to arc-shaped or U letter-shaped when it is looked from the optical axis direction, the gate-cut plane which is the concave surface, is easily processed by the end-mill cutting machine. Further, when the arc-shape is a portion of the circle whose radius is not larger than 1 mm, the flange portion or the optical function portion can not be excessively cut.

(2-18) The plastic lens described in any one of (2-1) to (2-17), in which the concave surface is formed at the time of the formation of the gate-cut plane.

According to the invention described in (2-18), when the concave surface is formed at the time of cutting of the gate portion, the production of the lens can be quickly conducted.

(2-19) The plastic lens which has the almost arc-shaped concave surface at least at one portion of the outer periphery of the flange portion when viewed from the optical axis direction.

(2-20) The plastic lens which has the almost U letter-shaped concave surface at least at one portion of the outer periphery of the flange portion when viewed from the optical axis direction.

According to the invention described in (2-19) and (2-20), because, when the plastic lens is viewed from the optical axis direction, because the almost arc-shaped or almost U letter-shaped concave surface exists at least at one portion of the outer periphery of the flange portion, specifically when the plastic lens is viewed from the optical axis direction, a portion forming the concave surface of the lens can be made more distinct.

(2-21) A production method of the plastic lens, in which the gate-cut plane and the concave surface are formed by a common cutting means.

(2-22) A production method of the plastic lens, in which the gate-cut plane and the concave surface are formed by a series of cutting processes.

(2-23) A production method of the plastic lens, in which the gate-cut plane and the concave surface are formed by a common cutting means and a series of cutting processes.

According to the invention described in (2-21) to (2-23), when, as the cutting means for cutting the gate portion integrally formed with the plastic lens by the molding, and the cutting means for forming the concave surface, a common cutting means is used for forming the plastic lens, and these cutting are conducted by a series of cutting processes, it is not necessary that a plurality of cutting means are prepared, and the production can be conducted at low cost, and further, because it is conducted at one time, the plastic lens can be quickly produced.

DETAILED DESCRIPTION OF THE PREFERRED EMBODIMENT

The detail of the present invention will be described below.

In a plastic lens of the present invention , a concave surface is provided at least at a portion of a gate-located portion on the outer peripheral surface of the plastic lens. Incidentally, the concave surface may be provided on all portion of the gate-located portion, or may be provided at least at one portion of a gate-cut plane of the gate-located portion. Further, when the plastic lens has an optical functional portion and does not have a flange portion, it is preferable that the concave surface is provided on the outer peripheral surface of the optical functional portion. On the one hand, when the plastic lens has the optical functional portion and the flange portion, it is preferable that the concave surface is provided on the outer peripheral surface of the flange portion.

Figure 11:
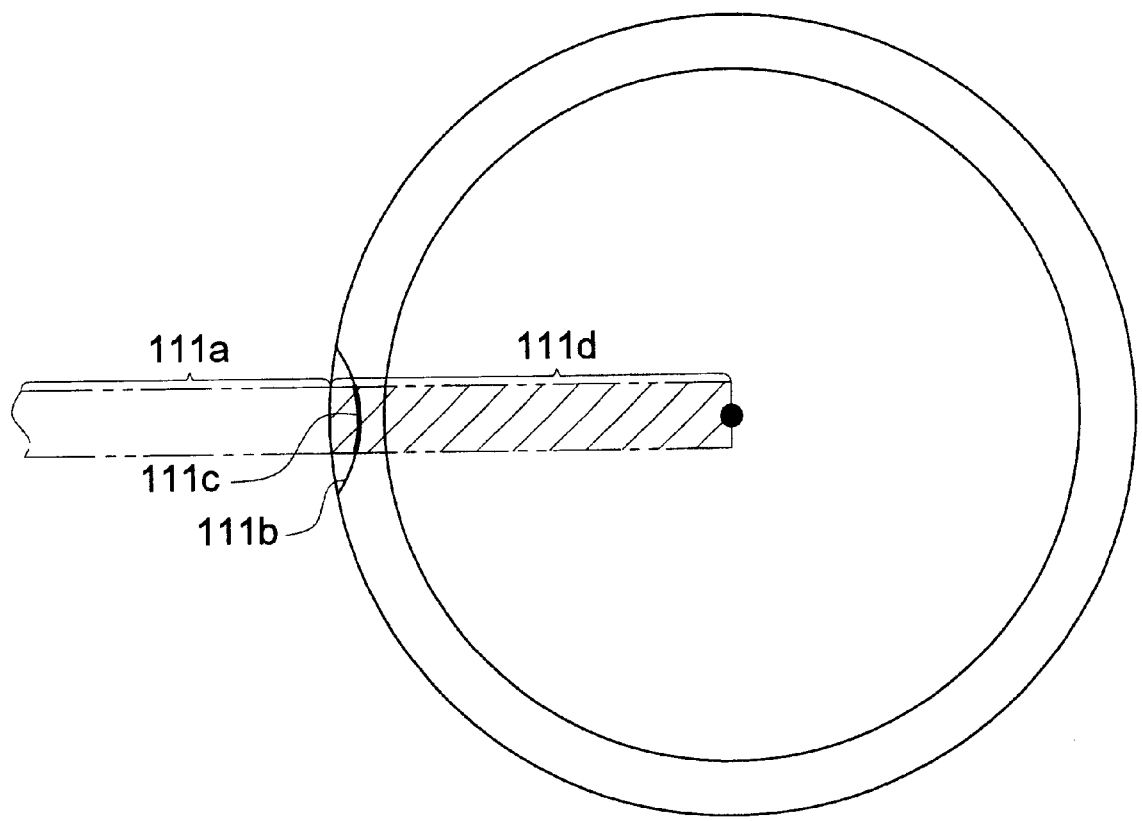
FIG. 11 is a view explaining a gate-located portion and a gate-cut plane of the plastic lens.
Figure 12:
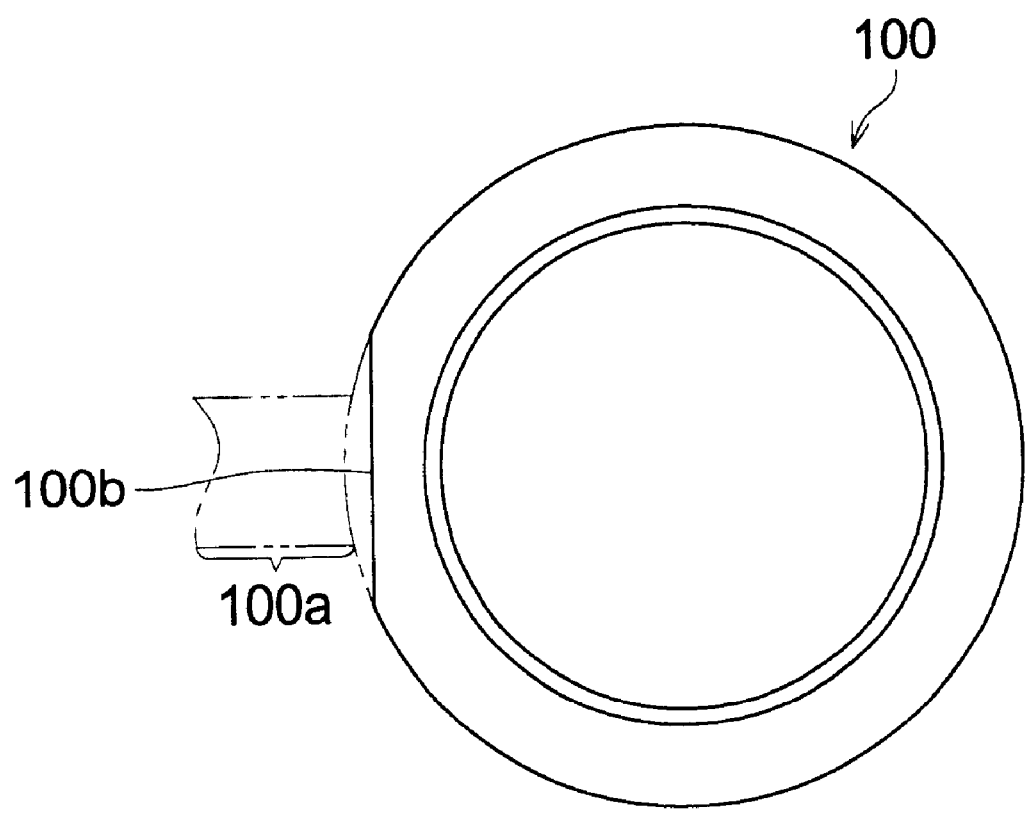
FIG. 12 is a view showing the conventional plastic lens.
Figure 13:
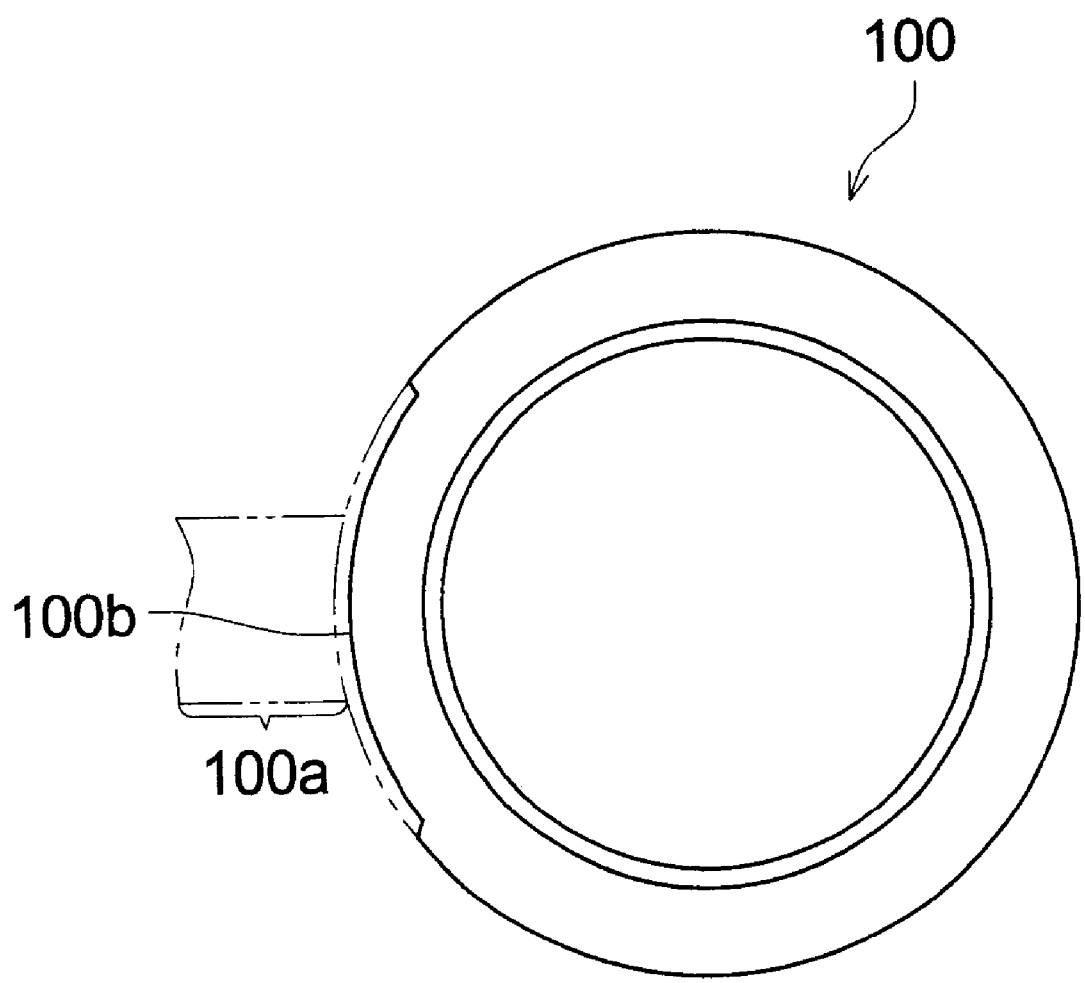
FIG. 13 is a view showing the conventional plastic lens.
Figure 14:
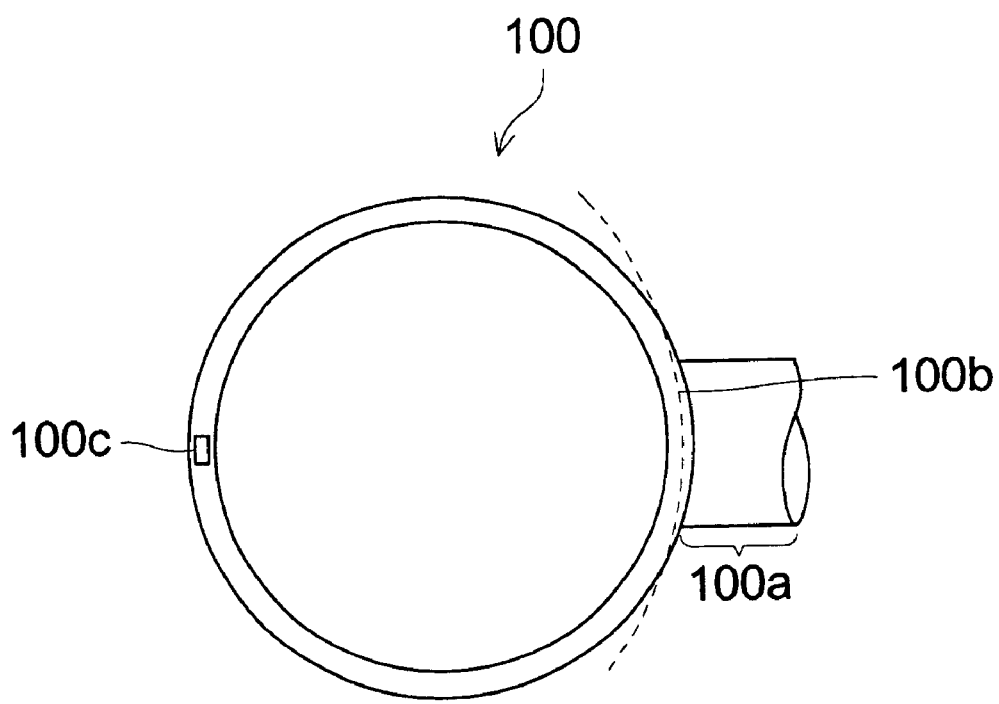
FIG. 14 is a view showing the conventional plastic lens.

"The gate-located portion" on described in the present specification indicates the surface which forms the external shape of the plastic lens in an area of an extension portion extended to the lens optical axis in the length direction of the gate portion when the plastic lens is viewed from the optical axis direction, and specifically, it indicates the surface as shown by numeral 111c in FIG. 11, and the gate portion is shown by numeral 111a, and the area of the extension portion extended to the lens optical axis in the length direction of the gate portion is written by hatched lines and shown by numeral 111d.

Incidentally, in the plastic lens, the gate-located portion exists at position at which the linear line of the shortest distance which connects a portion in which the internal strain is the maximum, that is, a position at which the double refraction is the maximum, to the optical axis, crosses the outer peripheral portion. Further, a position at which the double refraction is the maximum, can be detected by observing the plastic lens by using the polarizing plate. For example, when the plastic lens is observed by using the polarizing plate, the portion at which the rainbow colors are the darkest, is a position at which the double refraction is the maximum.

The "gate-cut plane" described in the present specification indicates the surface formed on the plastic lens when the gate portion is removed by cutting, and/or excision and/or polishing, however, the surface in which the surface is further enlarged by the cutting and/or excision and/or polishing, or enlarged by the cutting and/or excision and/or polishing, also corresponds to the gate-cut plane in the present specification. The gate-cut plane is, preferably, the cutting plane formed by a process (a series of processes) of the cutting and/or excision and/or polishing. Specifically, the gate-cut plane indicates the surface as shown by numeral 111b in FIG. 11.

The gate-cut plane may also coincide with the gate-located portion, or may also be the surface including the gate-located portion and larger than the portion. In this connection, the gate-cut plane other than the concave surface may be the plane or the arc-shaped convex surface. Further, the gate-cut plane may serve as the concave surface too.

The "concave surface" described in the present specification, means all or a part of the surface whose shape is concave when the external shape of the plastic lens is viewed from the optical axis direction or from the direction perpendicular to the optical axis. The word concave herein may be concave when it is viewed wholly, and its microscopic shape is not matter. For example, when viewed microscopically, even when one or a plurality of convex portions are formed into concave, when it is concave when viewed macroscopically, it corresponds to the concave surface herein. As an example of this concave surface, various shapes such as the arc-shape, U letter-shape, V letter-shape, can be listed, however, the shape in which the bottom portion of the concave can be easily distinguished such as in the arc-shape, U letter-shape, or V letter-shape, is preferable. Further, the bottom portion may have the plane portion, and further, for example, it may be "⊐" letter-shape. In this connection, although it is preferable that, in the concave surface, as shown in FIG. 1 to FIG. 11, the shape when viewed from the optical axis of the plastic lens is concave, a shape in which the shape of the concave surface viewed from the optical axis of the plastic lens can not be distinguished as concave, may also be allowable. For example, as shown in FIG. 15, a shape in which the shape of the concave surface viewed from the optical axis of the plastic lens can not be distinguished as concave, but it can be distinguished as concave when viewed from the direction perpendicular to the optical axis, may also be allowable.

Figure 15:
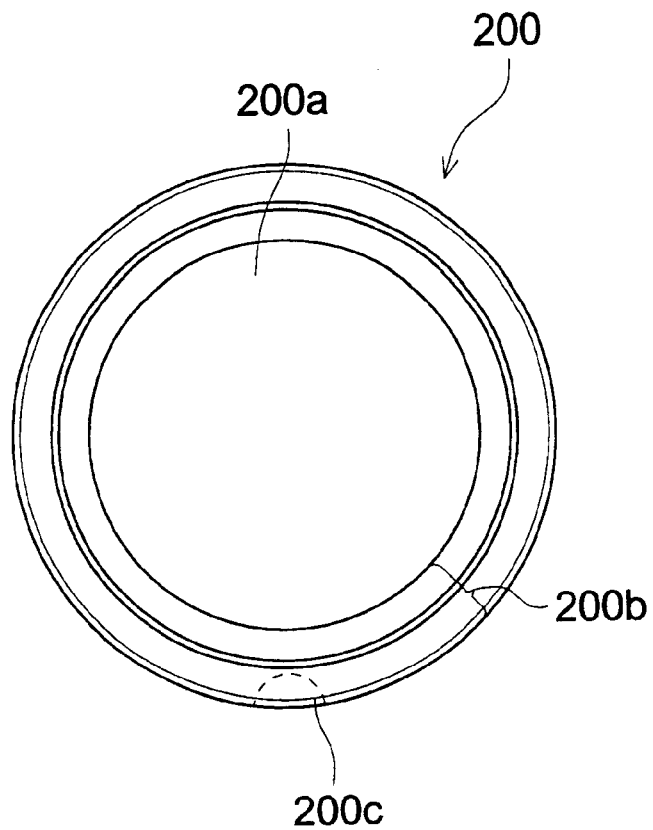
FIGS. 15(a) and 15(b) each is a view showing an embodiment of the production of the plastic lens.
Figure 15:
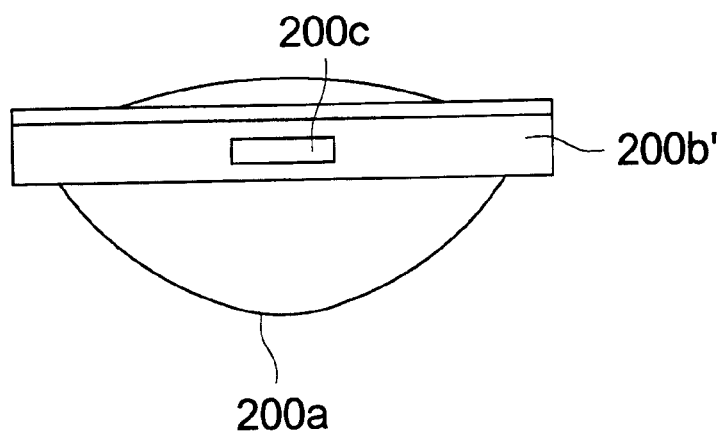

In a plastic lens 200 in FIG. 15, numeral 200a is the optical function portion, numeral 200b is the flange surface of the flange portion, numeral 200b' is the outer peripheral surface of the flange portion, and numeral 200c is the concave surface. Further, in FIG. 15, the concave portion is provided on only a part of the outer peripheral surface in the direction of the optical axis. However, the concave portion may be provided on an entire portion of the outer peripheral surface in the direction of the optical axis and the concave portion may be provided such that the concave surface can not be seen when the lens is viewed along the optical axis.

The phrase [the concave surface is the curved surface] written in the present specification, means that, when the above concave surface is viewed from the optical axis direction, it becomes a curve.

The "bottom portion of the concave surface" described in the present specification means a portion of the most sunken position in the above concave surface, that is, indicates a portion of the position in which the distance to the optical axis is the shortest in the concave surface.

"A series of cutting process" described in the present specification includes that the cutting for forming the cutting plane and the cutting for forming the concave surface are continuously or intermittently conducted in a series of cutting processes, and a process in which the formation of the cutting plane and the formation of the concave surface are simultaneously conducted, a process in which the formation of the concave surface is conducted on the way of the formation of the cutting plane, or a process in which the formation of the concave surface is conducted before or after the formation of the cutting plane, may also be allowable.

The "common cutting means" indicates that the means for forming the cutting surface is the same as the means for forming the concave surface.

The "outer peripheral surface" described in the present specification indicates a portion which is formed as the peripheral surface when the plastic lens is viewed from the direction perpendicular to the optical axis direction. For example, numeral $1b'$ in FIG. 1(b), or numeral $11b'$ in FIG. 3(b) is referred to the outer peripheral surface. Numeral $1b$ in FIG. 1(b) or numeral $11b$ in FIG. 3(b) is not the outer peripheral surface. In this connection, numeral $1b'$ in FIG. 1(b) is the outer peripheral surface of the flange portion, and numeral $1b$ is the flange surface of the flange portion. On the one hand, numeral $11b'$ in FIG. 3(b) is the outer peripheral surface of the optical functional portion.

The "optical functional portion" or "optical function portion" described in the present specification indicates a portion having the function to diverge or converge the luminous flux in the plastic lens.

The "flange portion" described in the present specification indicates a portion used for holding the plastic lens when the plastic lens is mounted in the apparatus. In many cases, the flange portion is provided on the outer periphery of the plastic lens.

Referring to the drawings, an embodiment of the plastic lens of the present invention will be described below, however, the present invention is not limited to the present embodiment.

Figure 1:
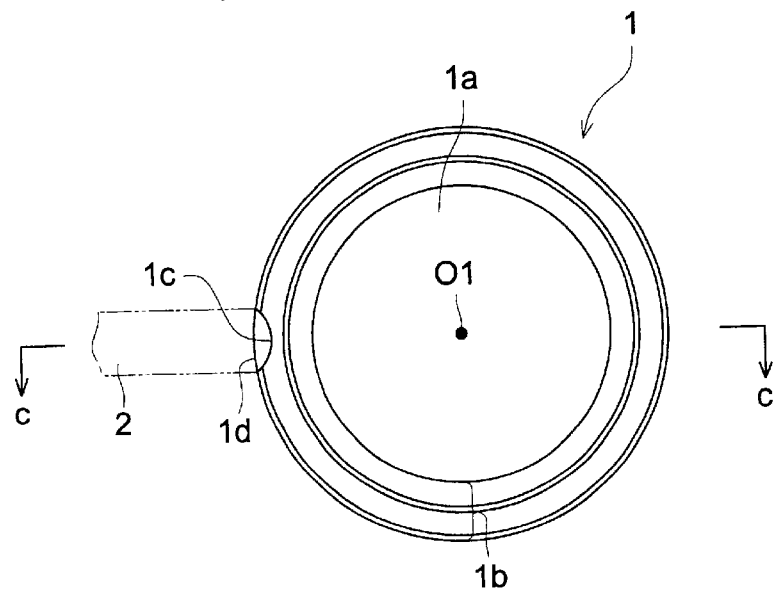
FIGS. 1(a) to 1(c) each is a view showing an embodiment of a plastic lens having a flange portion.
Figure 1:
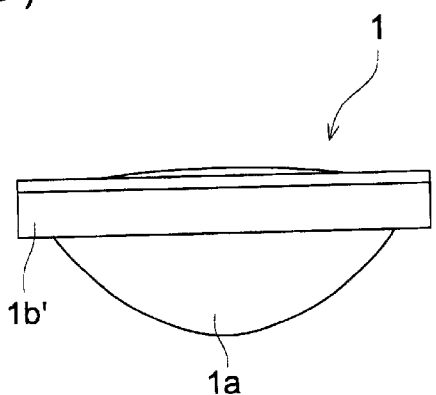
Figure 1:
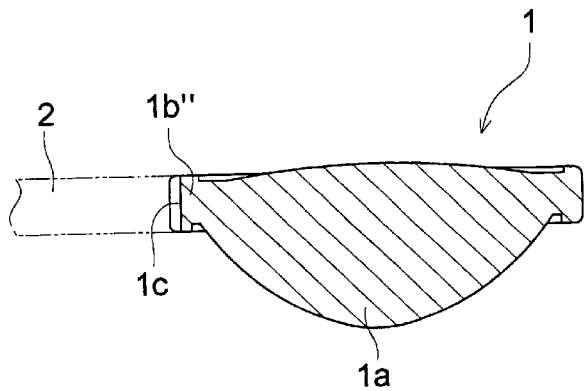

FIG. 1 shows an embodiment of a plastic lens having a flange portion, and FIG. 1(a) is a plan view, FIG. 1(b) is a side view, FIG. 1(c) is a sectional view along the c—c line in FIG. 1(a).

A plastic lens 1 of this embodiment is formed by the injection molding, and has an optical functional portion $1a$, and a flange portion $1b$ on the outer periphery of the optical functional portion $1a$. In the present embodiment, all of the outer peripheral portion of the optical functional portion $1a$ is the flange portion $1b$. At the time of molding, a gate portion 2 which is a resin injection path, is integrally formed with the flange portion $1b$. A gate-located portion of the flange portion $1b$ is a gate-cut plane $1c$ which is the concave surface.

Figure 2:
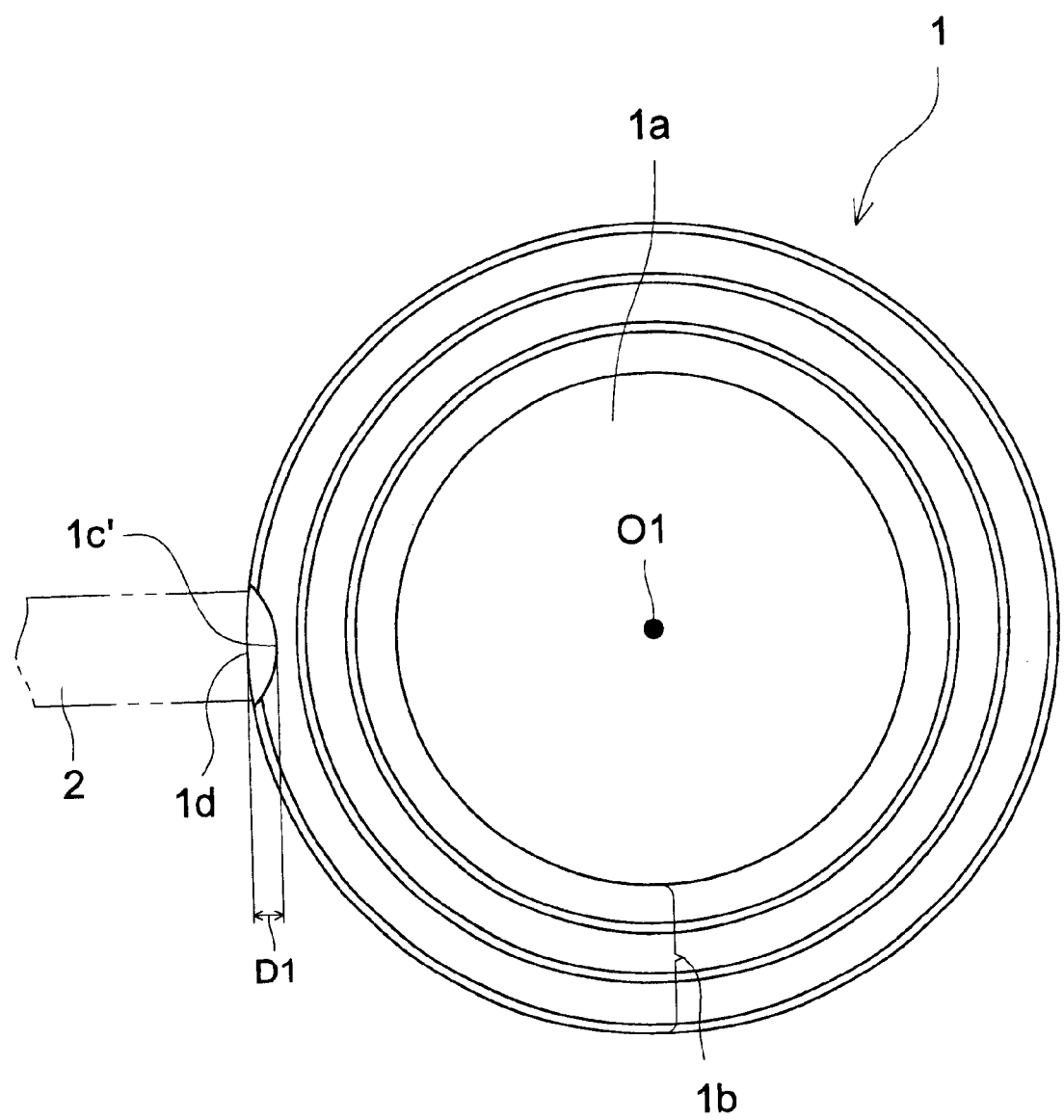
FIG. 2 is a view showing another embodiment of the plastic lens having a flange portion.

Further, the gate-located portion of the flange portion $1b$ may be the concave surface, and as shown in FIG. 2, the gate-cut plane $1c'$ may be formed larger than the gate-located portion.

As described above, because the gate-located portion of the flange portion $1b$ is the concave surface, and the concave surface is the sunken shape which is concave to the lens optical axis side O1 with respect to the virtual outer peripheral surface id of the flange portion $1b$, its position becomes definite by the concave surface.

Accordingly, when the plastic lens 1 is assembled in the optical apparatus, the detection of the concave surface can be easily conducted by eyes and the detector, and the detection accuracy of the gate-located position is increased. Therefore, the plastic lens 1 can be easily and accurately assembled in the constant direction on the basis of the concave surface, thereby, the assembling operability is increased and the optical performance is also stabilized.

Further, referring to FIG. 2, when the description will be made, by making the shortest distance D1 between the virtual outer peripheral surface $1d$ of the flange portion $1b$ and the bottom portion of the concave surface, 0.15–0.25 mm, in the detection of the gate-located position, specifically the detection by eyes can be easily conducted, and the flange portion $1b$ can be processed so as not to be excessively cut.

Further, in the embodiment shown in FIG. 1 and FIG. 2, the gate cutting out plane $1c$ is the curved surface. Thereby, the formation of the gate cutting surface $1c$ including the formation of the concave surface becomes easy. Specifically, when the curved surface is arc-shaped when the plastic lens is viewed from the optical axis direction, the gate-cut plane $1c$ forming the concave surface can be easily processed by the end mill cutting machine.

Further, it is preferable that this arc-shape is a portion of the circle those radius is smaller than 1 mm, and the gate-cut plane $1c$ can be easily processed by the end mill cutting machine, and the flange portion $1b$ can be processed so as not to be excessively cut.

Further, as described in the above embodiments, it is preferable that the concave surface is formed at the time of the cutting of the gate portion 2 formed at the molding, thereby, the lens production can be quickly conducted. In this connection, in the embodiment as shown in FIG. 2, all of the gate cutting surface $1c$ is the concave surface, however, when the gate-located portion is formed into the concave surface, the other portion may also be the arbitrary shape.

Figure 3:
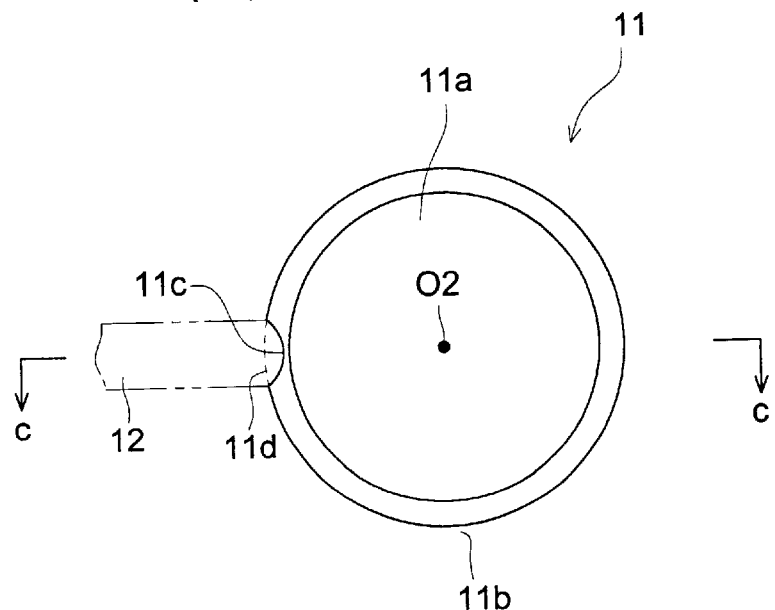
FIGS. 3(a) to 3(c) each is a view showing an embodiment of a plastic lens not provided with a flange portion.
Figure 3:
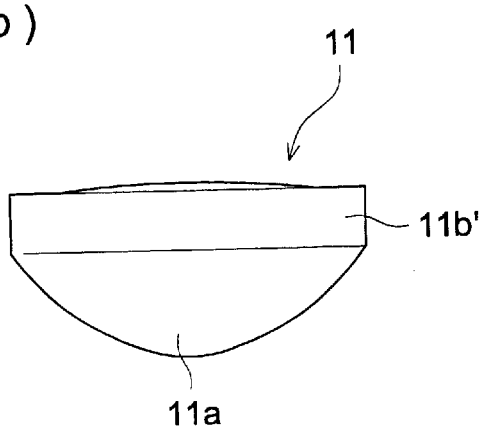
Figure 3:
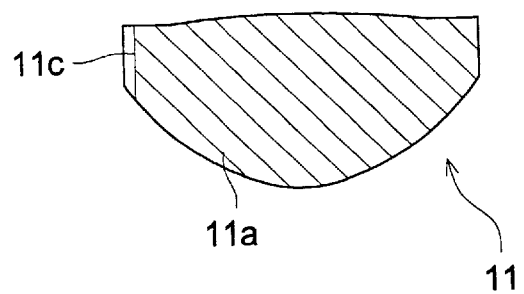

FIG. 3 shows an embodiment of the plastic lens onto which the flange portion is not provided, and FIG. 3(a) is a plan view, FIG. 3(b) is a side view and FIG. 3(c) is a sectional view along the c—c line of FIG. 3(a).

The plastic lens 11 in this embodiment, is formed by the injection molding, and has the optical functional portion $11a$. At the time of molding, the gate portion 12 which is the resin injection path is integrally formed with the optical functional portion $11a$. The gate-located portion of the optical functional portion $11a$ is the gate-cut plane $11c$ which is the concave surface.

Figure 4:
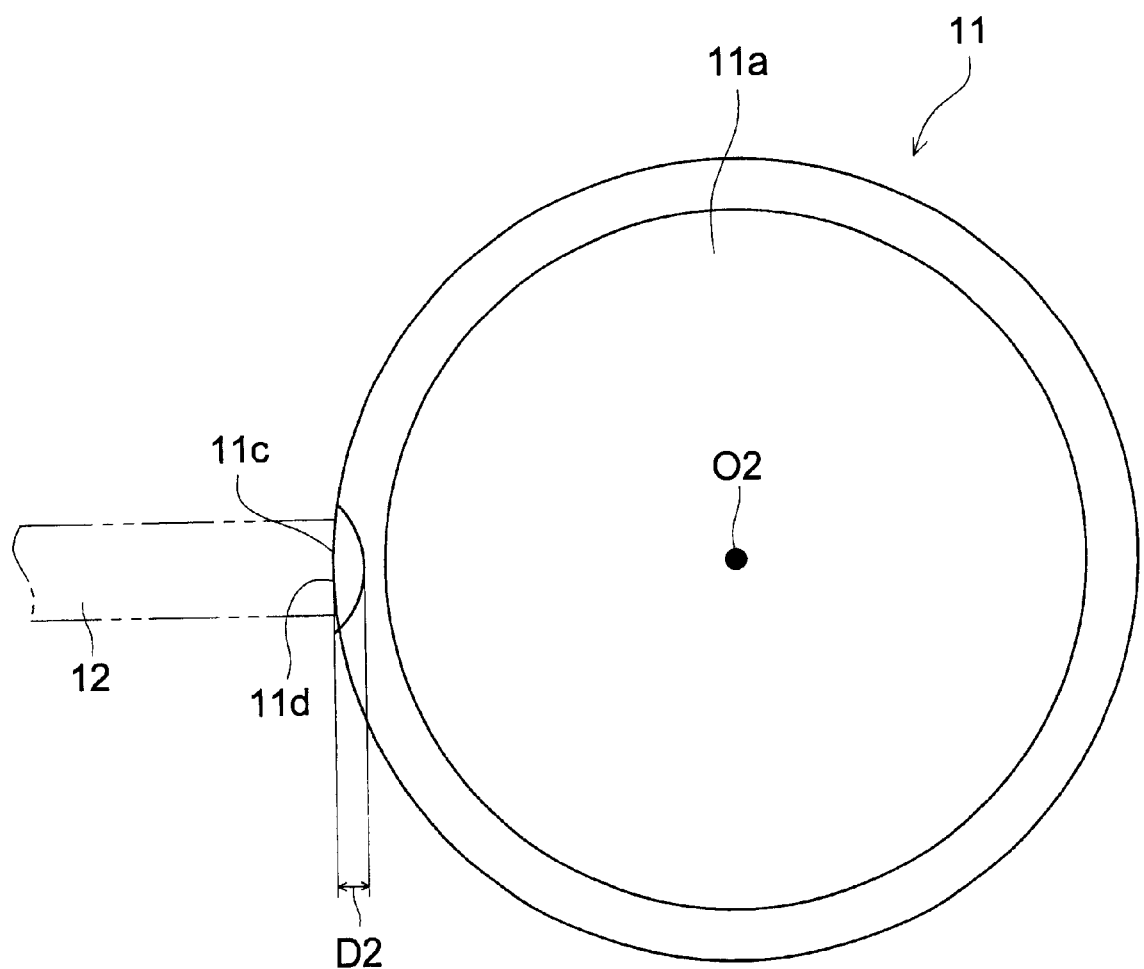
FIG. 4 is a view showing another embodiment of the plastic lens not provided with the flange portion.

Further, when the gate-located portion of the optical function portion $11a$ is the concave surface, it is allowable, and as shown in FIG. 4, the gate-cut plane $11c'$ may also be formed larger than the gate-located portion.

As described above, the gate-located portion of the optical functional portion $11a$ is the concave surface, and because the concave surface is the sunken shape which is concave to the lens optical axis side O2 side with respect to the virtual outer peripheral surface $11d$ of the optical functional portion $11a$, its position becomes definite by the concave surface.

Further, referring to FIG. 4, when the description will be made: when the shortest distance D2 between the virtual outer peripheral surface $11d$ of the optical functional portion $11a$ and the bottom portion of the concave surface is 0.15–0.25 mm, at the detection of the gate-located position, specifically the detection by eyes can be made easy, and the flange portion can be processed so as not to be excessively cut.

Further, in the embodiments as shown in FIG. 3 and FIG. 4, the gate-cut plane $11c$ is the curved surface. Thereby, the formation of the gate-cut plane $11c$ including the formation of the concave surface becomes easy. Specifically, because the curved surface is arc-shaped when the plastic lens 11 is viewed from the optical axis direction, the gate-cut plane 11c which will be the concave surface can be easily processed by the end mill cutting machine.

Further, this arc-shape is preferably a portion of the circle whose radius is smaller than 1 mm, thereby, the gate-cut plane 11c can be easily processed by the end mill cutting machine, and the optical functional portion 11a can be processed so as not to be excessively cut.

Further, as described in the above embodiments, it is preferable that the concave surface is formed at the time of the cutting of the gate portion 12 formed at the molding, thereby, the lens production can be quickly conducted. In this connection, in the embodiment as shown in FIG. 4, all of the gate cutting surface 11c is the concave surface, however, when the gate-located portion is formed into the concave surface, the other portion may also be the arbitrary shape.

Figure 5:
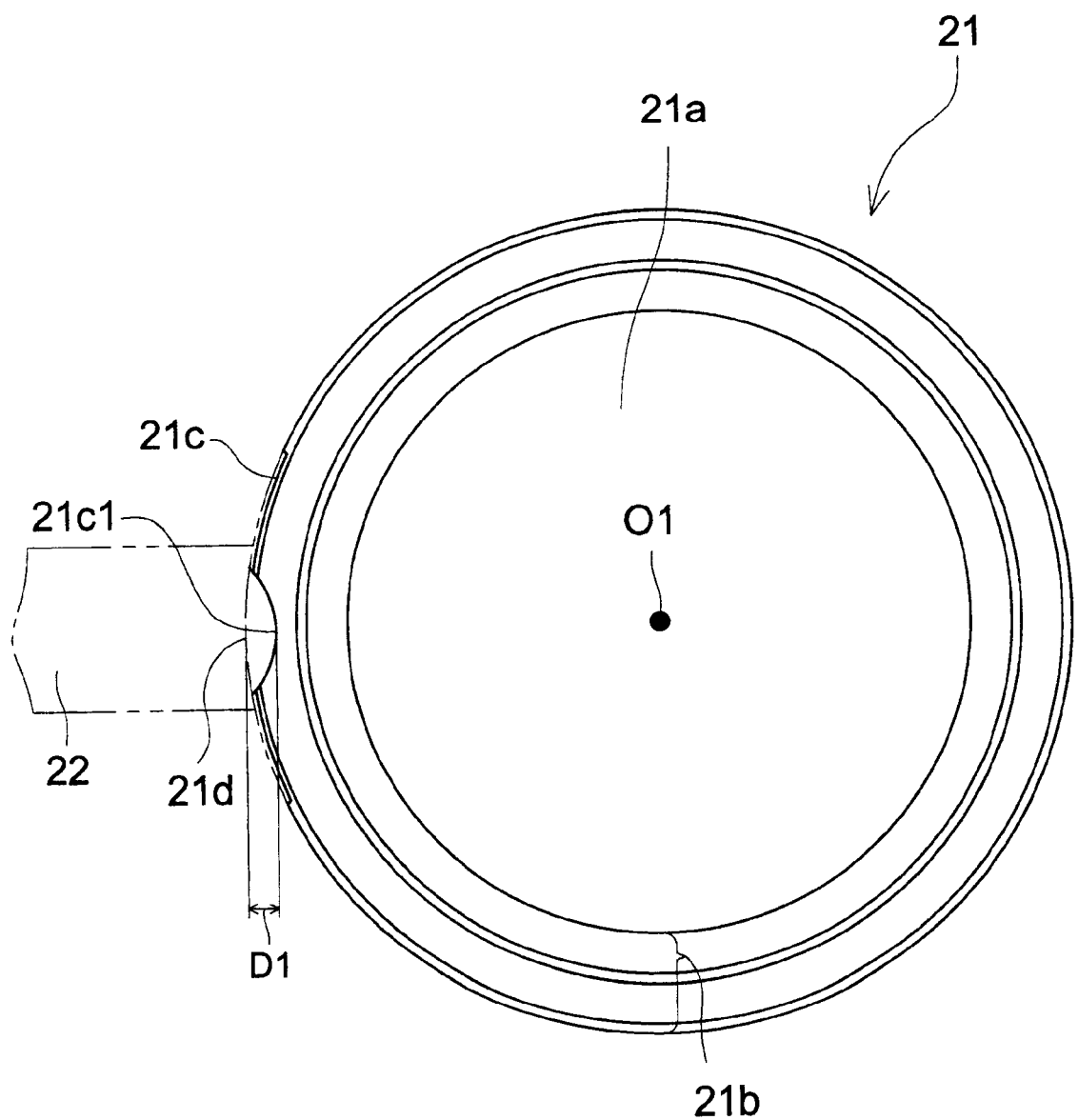
FIG. 5 is a view showing an embodiment of a plastic lens provided with the flange portion.
Figure 6:
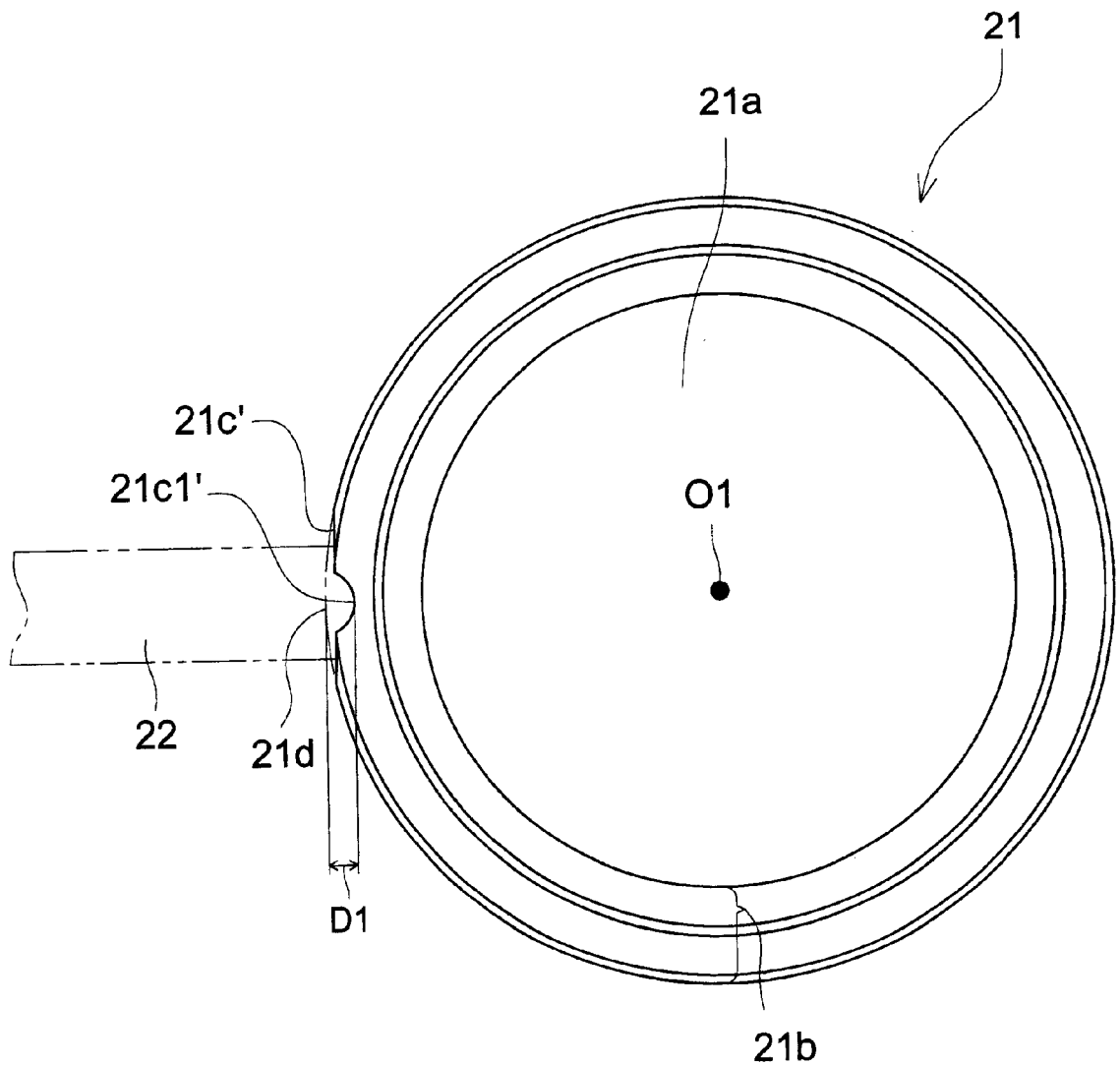
FIG. 6 is a view showing another embodiment of the plastic lens provided with the flange portion.

FIG. 5 and FIG. 6 are plan views showing other embodiments of the plastic lens with the flange portion, and the plastic lens 21 of the embodiment in FIG. 5 has a flange portion 21b on the outer periphery of an optical functional portion 21a, and has a gate-cut plane 21c on the flange portion 21b, and in the gate-cut plane 21c, at least a portion of the gate-located portion is the concave surface 21c1. In this connection, the gate portion is shown by numeral 22, and the shortest distance D1 between the virtual outer peripheral surface 21d and the bottom portion of the concave surface is 0.15–0.25 mm.

As described above, because the concave surface 21c1 is formed at least at one portion of the gate-located portion of the gate cutting surface 21c of the flange portion 21b, the gate-located position becomes definite, and the detection accuracy of the gate-located portion by eyes and the detector is increased, and the plastic lens can be easily and accurately assembled in a constant direction on the basis of the concave surface 21c1, and the lens performance can be stabilized, and the assembling operability is also increased.

In the present embodiment, an example in which the cutting plane 21c other than the concave surface 21c1 is formed into the arc-shaped convex surface (the arc-shape along the outer periphery of the plastic lens), is shown, however, as shown in FIG. 6, the cutting plane 21c' may be formed into the plane-shape, or the radius of curvature of the concave surface 21c1' may also be formed in a smaller one.

Figure 7:
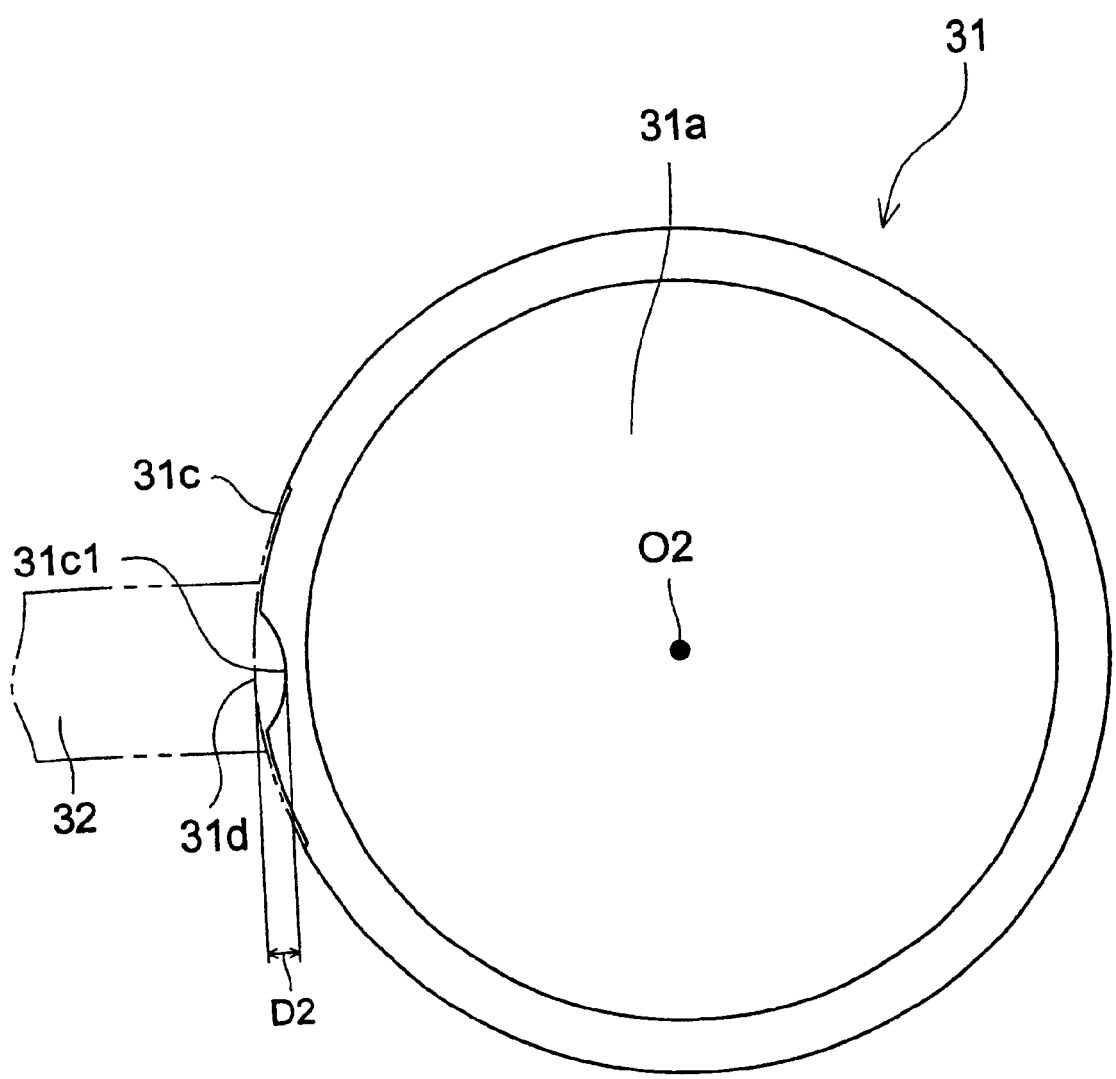
FIG. 7 is a view showing still another embodiment of the plastic lens not provided with the flange portion.
Figure 8:
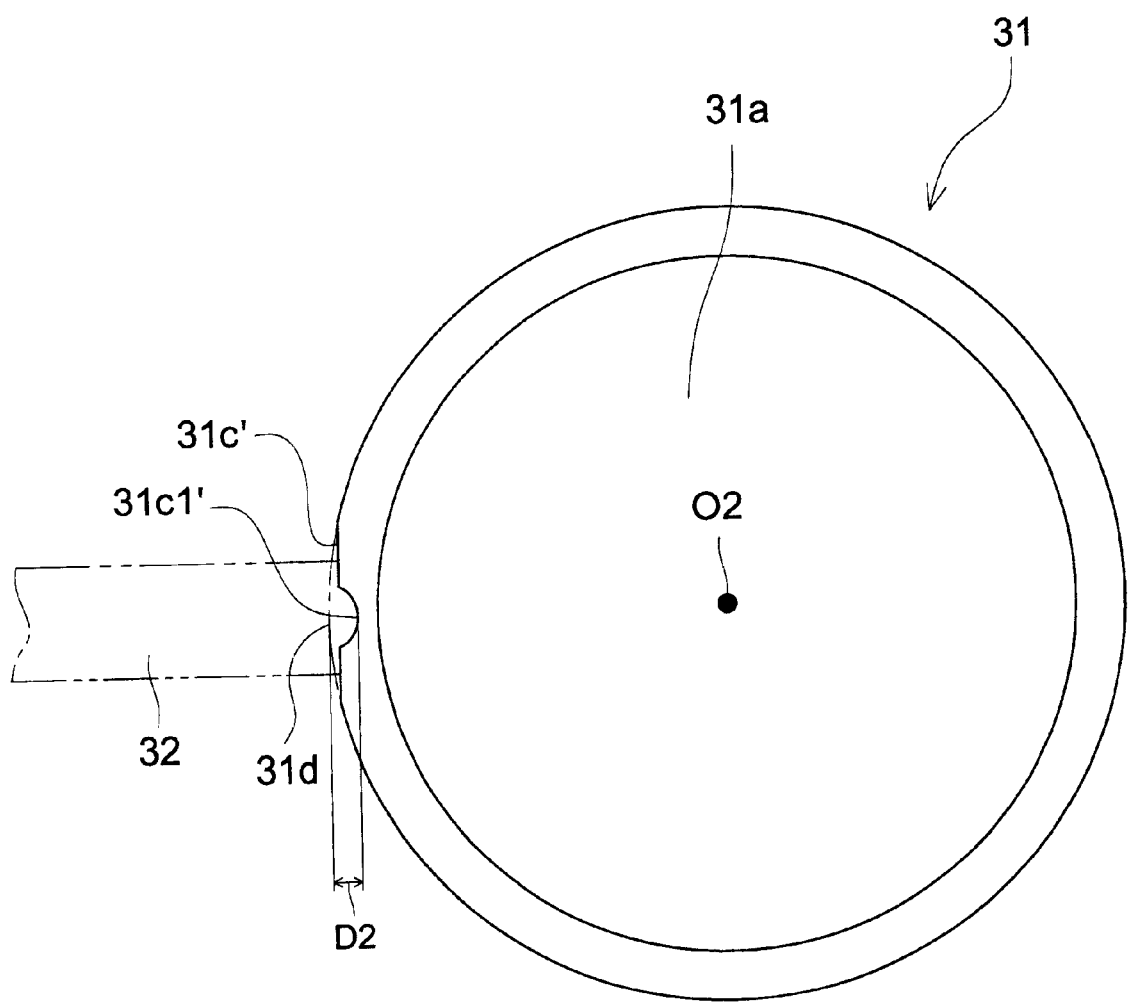
FIG. 8 is a view showing yet another embodiment of the plastic lens not provided with the flange portion.

FIG. 7 and FIG. 8 are plan views showing other embodiments of a plastic lens having no flange portion, and in the embodiment of FIG. 7, a gate-cut plane 31c is provided on an optical functional portion 31a of the plastic lens 31, and in the cutting plane 31c, at least one portion of the gate-located portion is the concave surface 31c1. In this connection, the gate portion is shown by numeral 32, and the shortest distance D2 between the virtual outer peripheral surface 31d and the bottom portion of the concave surface is 0.15–0.25 mm.

As described above, because at least one portion of the gate-located portion of the gate-cut plane 31c of the optical functional portion 31a forms the concave surface 31c1, the gate-located position becomes definite, and the detection accuracy of the gate-located portion by eyes and the detector is increased, and the plastic lens can be easily and accurately assembled in the constant direction on the basis of the concave surface 31c, thereby, the lens performance is stabilized, and the assembling operability is also increased.

In the present embodiment, an example in which the gate-cut plane 31c other than the concave surface 31c1 is formed into the arc-shaped convex surface (the arc-shape along the outer periphery of the plastic lens), is shown, however, as shown in FIG. 8, the cutting plane 31c' may be formed into the plane-shape, or the radius of curvature of the concave surface 31c1' may also be formed into a smaller one.

Figure 9:
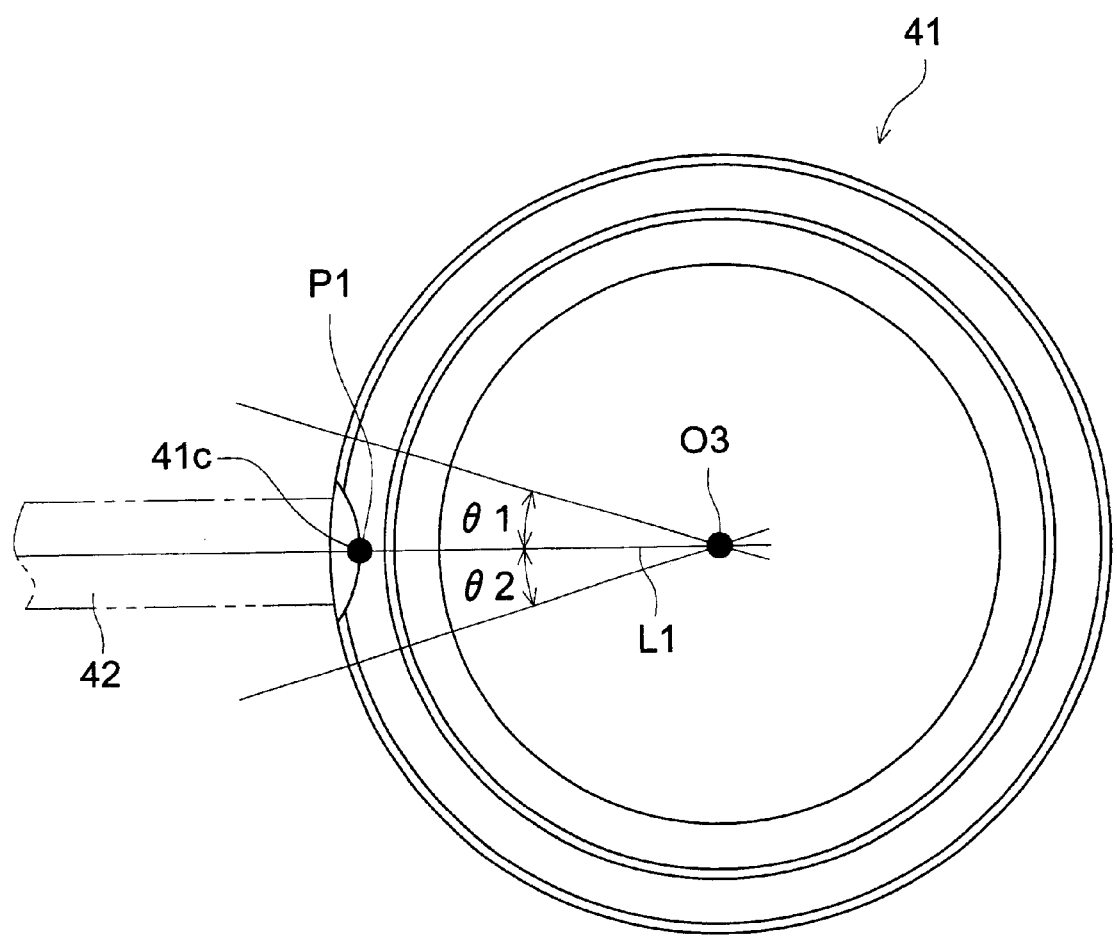
FIG. 9 is a view showing an embodiment of a concave surface of the plastic lens.
Figure 10:
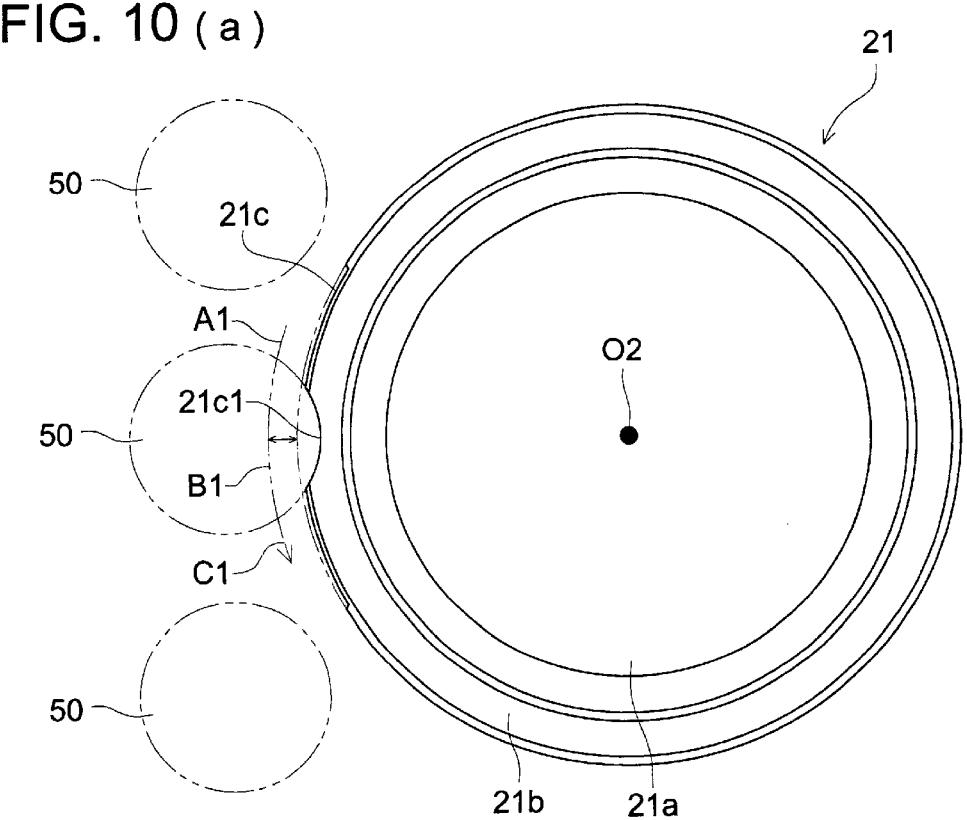
FIGS. 10(a) and 10(b) each is a view showing an embodiment of the production of the plastic lens.
Figure 10:
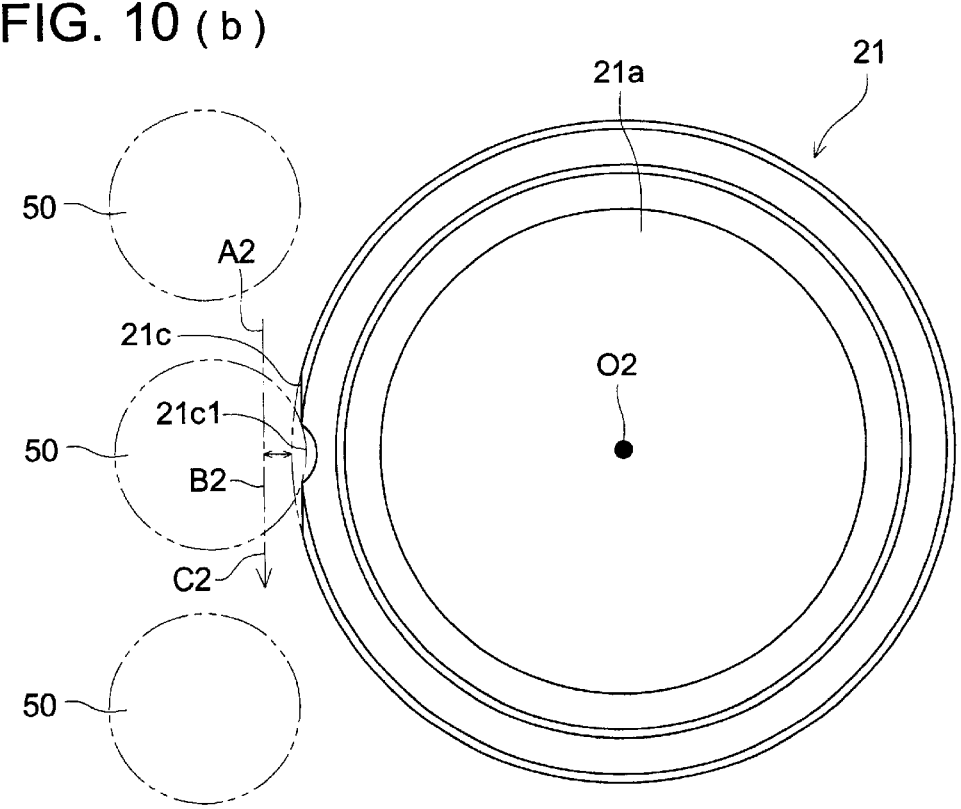

Next, in the concave surfaces of the above plastic lenses 1, 11, 21, and 31, as shown in FIG. 9, angles formed between the linear line connecting the bottom portion P1 of the concave surface 41c to the lens optical axis O3, and the linear line L1 connecting the center of the gate-located portion to the lens optical axis O3 are within angles θ1 and θ2 of each 10°. Because the bottom portion P1 of the concave surface 41c is positioned within angles θ1 and θ2 of 10°, the bottom portion of the concave surface shows almost the central gate-located position, thereby, the central gate-located position of the gate-located position 42 becomes further definite, and specifically, because the plastic lens 41 is assembled on the basis of the bottom portion of the concave surface, the plastic lens can be accurately assembled, and the lens performance is more stabilized.

As specifically shown in the above embodiments, when the concave surface is provided, the gate-located position becomes definite, and the detection accuracy of the gate-located portion by eyes and the detector is increased, and the plastic lens can be easily and accurately assembled in the constant direction on the basis of the concave surface, thereby, the lens performance is stabilized, and the assembling operability is also increased.

Further, because, when the concave surface is viewed from the optical axis direction, it is formed so that the outer periphery becomes concave, the gate-located position becomes definite also from the side surface, and the detection accuracy of the gate-located portion is increased, and the plastic lens can be easily and accurately assembled in the constant direction on the basis of the concave surface, thereby, the lens performance is stabilized, and the assembling operability is also increased.

Further, when the concave surface is adopted, because the excessive cutting may not be conducted more than needed, (for example, large part of the flange can be remained as it is), the following effect can also be obtained: the problem in which the lens is separated from the holder at the time of coating, or from the holding portion of the storage case for the lens conveyance, or in some case, the problem in which the lens is dislocated with respect to the holder at the time of coating, and the coating is failed, can be prevented.

Next, a production method of the plastic lens will be described. FIG. 10(a) shows an embodiment in which, in order to obtain the plastic lens 21 shown in FIG. 5, the cutting means for cutting the gate portion integrally formed with the plastic lens by the molding, and the cutting means for forming the concave surface, are formed by using a common cutting means 50, and those cutting processes are conducted at a time, that is, those are conducted by a series of cutting processes, and FIG. 10(b) shows an embodiment to obtain the plastic lens 21 shown in FIG. 6.

In these embodiments, the end mill cutting machine is used as the common cutting means 50. In the process in which the cutting means 50 moves from A1 to C1 in the arrowed direction (in the arc-shape along the outer periphery of the plastic) in FIG. 10(a), a series of continuous movements in which it moves in the arrowed direction of B1, are conducted, and in the process in which the cutting means 50 moves from A2 to C2 in the arrowed direction in FIG. 10(b) (in the liner line-shape), a series of continuous movements in which it moves in the arrowed direction of B2, are conducted, and the cutting plane 21c and the concave surface 21c1 are formed. By using the common cutting means 50 as described above, by forming the cutting plane 21c and the concave surface 21c1, the plastic lens can be produced at low cost and quickly. In this connection, the cutting means 50 is not limited to the end mill cutting machine, but a cutting machine such as a laser, ultrasonic, press, may be used.

In this connection, the plastic lens in the present invention can be applied for a collimator lens for the optical pick-up apparatus, objective lens, or camera lens, video camera lens, micro camera lens, and lens for a lens-fitted film unit.

For example, when the optical pick-up apparatus has the laser light source, the converging optical system for converging the light emitted from the laser light source onto the information recording surface of the optical information recording medium, and the light detector for the reflected light on the information recording surface, and the converging optical system has the objective lens, the plastic lens of the present invention can be applied for the objective lens thereof. Further, when the converging optical system of the optical pick-up apparatus has the objective lens and the collimator lens, the plastic lens of the present invention can be applied also for the collimator lens. By using the plastic lens of the present invention, the optical pick-up apparatus having the stable optical performance can be obtained.

Further, as the preferable examples of devices using the leans of the present invention, a camera, digital still camera, video camera, and lens-fitted film unit, or a portable phone having an image pick-up micro camera using the plastic lens of the present invention, are listed. By using the plastic lens of the present invention, the above devices having the stable optical performance can be obtained.

As described above, in the invention of (1) to (20), the detection accuracy of the gate-located position of the plastic lens is increased, the plastic lens can be easily assembled in a constant direction, and the lens performance is stabilized.

In the invention described in (21) to (23), because a common cutting means is used, and the cutting plane and the concave surface are formed by one time of cutting process, the plastic lens can be produced at low cost and quickly.

Disclosed embodiment can be varied by a skilled person without departing from the spirit and scope of the invention.

What is claimed is:

1. A plastic lens molded through a gate in a molding process, comprising
    an optically functional section to perform an optical function;
    a circumferential section provided around the optically functional section;
    a gate-located portion on the circumferential section; and
    a concave section provided on at least a part of the gate-located portion on the circumferential section, the circumferential section having an imaginary tangent line at which an arc of a part of the circumferential section is cut away and comprising a concave surface concaved from the imaginary tangent line toward the optically functional section.

2. The plastic lens of claim 1, wherein a form of the concave surface is concave when the form is viewed along an optical axis of the plastic lens.

3. The plastic lens of claim 1, wherein the concave surface is provided onto an entire surface of the gate-located portion.

4. The plastic lens of claim 1, wherein the concave surface is provided on at least a part of a gate-cut surface in the gate-located portion.

5. The plastic lens of claim 4, wherein the gate-cut-out surface other than the concave surface is shaped in a flat surface or an arc-shaped convex surface.

6. The plastic lens of claim 4, wherein the gate-cut-out surface is the concave surface.

7. The plastic lens of claim 1, further comprising a flange section, wherein the concave section is provided on an outer peripheral surface of the flange section.

8. The plastic lens of claim 1, wherein a distance between an imaginary peripheral surface on the concave section and a bottom of the concave section has the shortest distance of 0.15 mm to 0.25 mm.

9. The plastic lens of claim 1, wherein an angle formed between a line connecting a bottom section of the concave section to an optical axis of the plastic lens with a shortest distance and a line connecting a center of the gate-located portion to the optical axis with a shortest distance is not larger than 10 degrees.

10. The plastic lens of claim 1, wherein the concave surface is a curved surface.

11. The plastic lens of claim 10, wherein a form of the curved surface is shaped an arc when the form is viewed along an optical axis of the plastic lens.

12. The plastic lens of claim 11, wherein the arc is a part of a circle whose radius is not larger than 1 mm.

13. A method of manufacturing a plastic lens having an optically functional section to perform an optical function and a circumferential section provided around the optically functional section, comprising steps of:
    forming the plastic lens through a gate by an injection molding, wherein a gate portion occupied in the gate is formed integrally on the circumferential section of the plastic lens during the step of forming the plastic lens;
    cutting out the gate portion from the circumferential section of the plastic lens; and
    providing a concave section on at least a part of a gate-located portion on the circumferential section of the plastic lens before, during, or after the step of cutting the gate portion, in such a manner that the concave section has an imaginary tangent line at which an arc of a part of the circumferential section is cut away and the concave section comprises a concave surface concaved from the imaginary tangent line toward the optically functional section.

* * * * *